(12) United States Patent
Oak

(10) Patent No.: US 12,019,509 B2
(45) Date of Patent: Jun. 25, 2024

(54) SWITCHING PROCESSOR CLOCK SIGNALS UPON FAULT DETECTION

(71) Applicant: QUALCOMM INCORPORATED, San Diego, CA (US)

(72) Inventor: Sunil Oak, Sugar Land, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/984,563

(22) Filed: Nov. 10, 2022

(65) Prior Publication Data

US 2024/0160520 A1 May 16, 2024

(51) Int. Cl.
*G06F 11/00* (2006.01)
*G06F 1/08* (2006.01)
*G06F 11/07* (2006.01)

(52) U.S. Cl.
CPC ............ *G06F 11/0793* (2013.01); *G06F 1/08* (2013.01); *G06F 11/0721* (2013.01)

(58) Field of Classification Search
CPC ............ G06F 11/0721; G06F 11/0793; G06F 11/0751; G06F 11/0796; G06F 1/04; G06F 1/06; G06F 1/08; G06F 1/10; G06F 11/1604
See application file for complete search history.

(56) References Cited

U.S. PATENT DOCUMENTS

| | | | |
|---|---|---|---|
| 6,078,225 A | 6/2000 | Bontekoe et al. | |
| 7,350,116 B1* | 3/2008 | Parrish | H04J 3/0688 |
| | | | 713/600 |
| 2007/0096782 A1* | 5/2007 | Ngo | H03L 7/18 |
| | | | 327/156 |
| 2012/0117415 A1 | 5/2012 | Arumugham et al. | |
| 2016/0065215 A1* | 3/2016 | Shin | H03K 19/0016 |
| | | | 327/45 |
| 2019/0052277 A1* | 2/2019 | Rapeta | G06F 11/0703 |
| 2019/0114235 A1* | 4/2019 | Wojewoda | G06F 11/142 |
| 2020/0117554 A1* | 4/2020 | Chaudhari | G06F 11/1679 |
| 2022/0091950 A1* | 3/2022 | Durga | G06F 11/263 |

OTHER PUBLICATIONS

Mueller, M.J. et al., Fully redundant clock generation and distribution with dynamic oscillator switchover, 2007, IBM (Year: 2007).*
Related PCT Patent App. Ser. No. PCT/US2023/032962, filed Sep. 16, 2023; International Search Report & Written Opinion transmitted on Dec. 15, 2023, 8 Pages.

* cited by examiner

*Primary Examiner* — Marc Duncan
(74) *Attorney, Agent, or Firm* — Smith Tempel Blaha LLC/Qualcomm

(57) ABSTRACT

A clock signal in a device may be switched to a fallback clock signal if a clock fault is detected. One or more subsystem clock signals provided to one or more subsystems of the device may be monitored. If a fault associated with a clock signal is detected, then a fallback clock signal may be provided to the subsystem in place of the subsystem clock signal.

12 Claims, 6 Drawing Sheets

SWITCHING PROCESSOR CLOCK SIGNALS UPON FAULT DETECTION

DESCRIPTION OF THE RELATED ART

A computing device may include multiple processor-based subsystems. Such a computing device may be, for example, a portable computing device ("PCD"), such as a laptop or palmtop computer, a cellular telephone or smartphone, portable digital assistant, portable game console, etc. Still other types of PCDs may be included in automotive and Internet-of-Things ("IoT") applications.

The multiple subsystems may be included within the same integrated circuit chip or in different chips. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other subsystems, such as a transceiver or "modem" subsystem that provides wireless connectivity, a memory subsystem, etc.

Computing devices and their components may experience operational failures, possibly leading to undesirable outcomes. In some types of computing devices, such as safety-critical systems, an unexpected failure may lead to conditions dangerous to users or others. Although failures may have many causes, one such cause is related to failure or degradation of clock signals on which subsystems rely. A clock signal may be delivered from a source, such as an oscillator circuit or a phase-locked loop, to a subsystem via a clock signal distribution network sometimes referred to as a clock tree. A clock tree may include buffer circuits for controlling the rise and fall time of clock edges, improving signal stability and reducing jitter where multiple copies of the clock signal are fanned out to multiple subsystems. The clock source and clock buffers may be subject to performance degradation or failure. Conditions such as temperature extremes may contribute to such degradation or failure. A failing or degraded clock signal distribution network may deliver a faulty clock signal to a processor. In some instances, a processor may be capable of continuing to operate despite a faulty clock signal, but the processor may produce incorrect results.

Some safety-critical systems include clock fault detection circuitry that can detect and respond to clock faults. Clock fault detection circuitry may respond to a detected clock fault by alerting an operator of a potentially unsafe condition, placing the system in a fail-safe mode, or responding in other ways that promote safety. Nevertheless, such responses may be insufficient to provide continued safe operation when a subsystem continues to operate based on a faulty clock signal.

SUMMARY OF THE DISCLOSURE

Systems, methods, and other examples are disclosed for switching clock signals in a device in response to fault detection.

An exemplary method for switching clock signals in a device may include providing at least a first clock signal to a first subsystem of the device. The exemplary method may also include monitoring at least the first clock signal, including detecting at least one fault associated with the first clock signal. The exemplary method may further include switching from providing the first clock signal to the first subsystem to providing another clock signal to the first subsystem in response to detection of a fault associated with the first clock signal.

An exemplary system for switching clock signals in a device may include fault detecting circuitry/logic configured to monitor at least a first clock signal provided to a first subsystem of the device and to detect at least one fault associated with the first clock signal. The exemplary system may also include clock switching circuitry/logic configured to switch from providing the first clock signal to the first subsystem to providing another clock signal to the first subsystem in response to detection of a fault associated with the first clock signal.

Another exemplary system for switching clock signals in a device may include means for providing at least a first clock signal to a first subsystem of the device. The exemplary system may also include means for monitoring at least the first clock signal, including means for detecting at least one fault associated with the first clock signal. The exemplary system may further include means for switching from providing the first clock signal to the first subsystem to providing another clock signal to the first subsystem in response to detection of a fault associated with the first clock signal.

An exemplary system-on-a-chip or "SoC" may include two or more subsystems, each including processing logic operable based on at least one clock signal. The exemplary SoC may also include fault detecting logic configured to monitor each of two or more clock signals provided to the subsystems and to detect at least one fault associated with a monitored clock signal. The exemplary SoC may further include clock switching logic configured to switch from providing the monitored clock signal to a corresponding subsystem to providing another clock signal to the corresponding subsystem in response to detection of a fault associated with the monitored clock signal.

BRIEF DESCRIPTION OF THE DRAWINGS

In the Figures, like reference numerals refer to like parts throughout the various views unless otherwise indicated. For reference numerals with letter character designations such as "101A" or "101B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
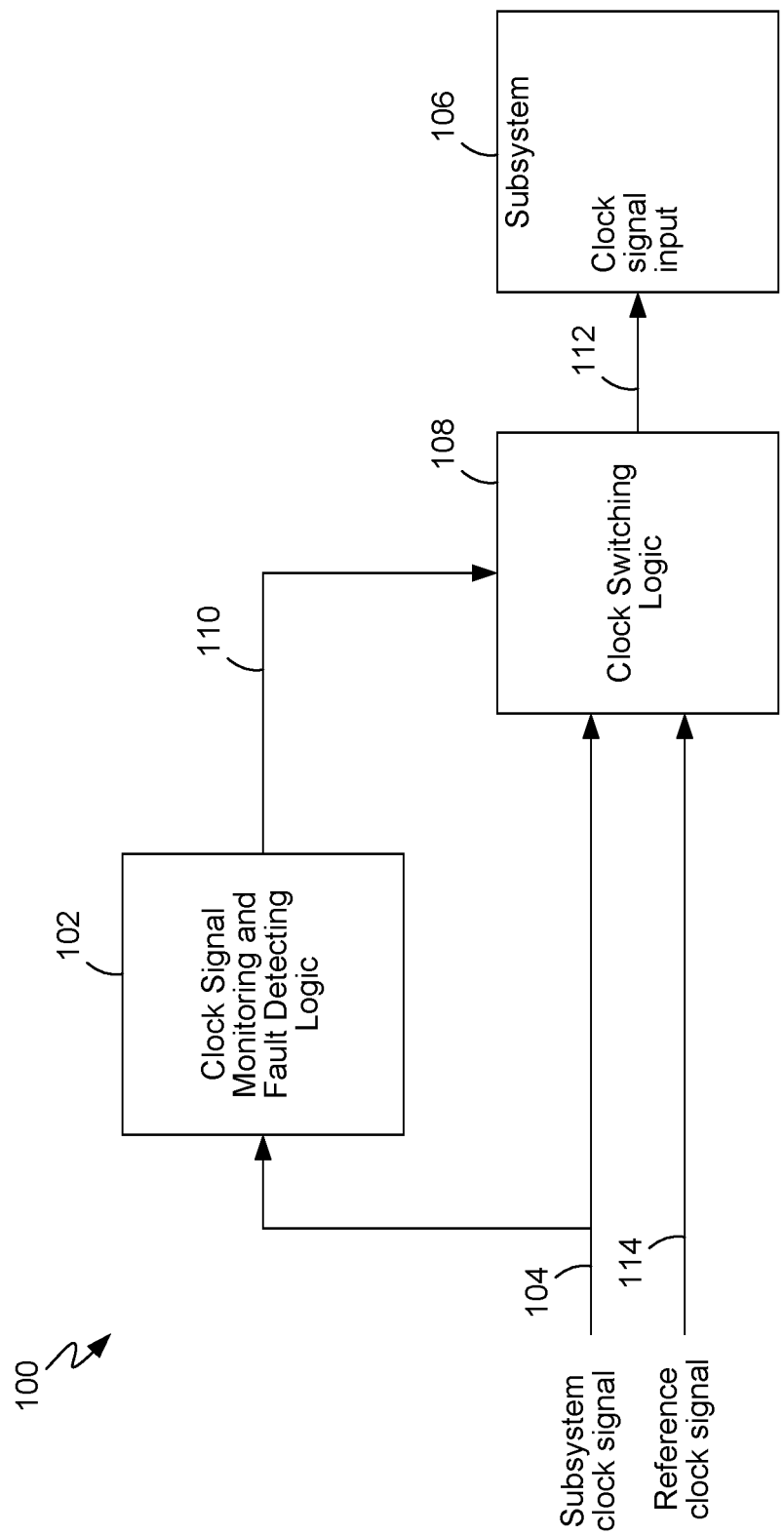
FIG. 1 is a block diagram of a system for switching clock signals in a device in response to fault detection, in accordance with exemplary embodiments.

In FIG. 1, a system 100 for switching clock signals may include a clock signal monitoring and fault detecting logic unit 102. The clock signal monitoring and fault detecting logic unit 102 may be configured to monitor a subsystem clock signal 104 that is being provided to a subsystem 106 of the system 100. The system 100 may also include a clock switching logic unit 108. The subsystem clock signal 104 may be provided to the subsystem 106 via the clock switching logic unit 108. The clock signal monitoring and fault detecting logic unit 102 may be configured to detect one or more faults associated with the monitored clock signal 104. Examples of such faults are described below and include deviation of the frequency of the monitored clock signal 104 from a reference frequency.

If the clock signal monitoring and fault detecting logic unit 102 detects a fault associated with the monitored subsystem clock signal 104, the clock signal monitoring and fault detecting logic unit 102 may provide a signal or other indication 110 of such detection to the clock switching logic unit 108. In response to the indication 110, the clock switching logic unit 108 may switch its output signal 112, which is coupled to a clock signal input of the subsystem 106, from the subsystem clock signal 104 to a reference clock signal 114. Although not shown in FIG. 1, in some examples the clock signal monitoring and fault detecting logic unit 102 may base the aforementioned reference frequency on the reference clock signal 114 or a similar reference clock signal.

The subsystem clock signal 104 may be provided to the subsystem 106 until such time as a clock signal fault is detected. That is, the subsystem clock signal 104 may be a primary clock signal on which the subsystem 106 operates under most conditions, and the reference clock signal 114 may be a fallback clock signal on which the subsystem 106 operates (instead of or in place of the subsystem clock signal 104) only after a clock signal fault is detected.

As understood by one of ordinary skill in the art, the subsystem clock signal 104 may be provided from a clock signal source (not shown), such as an oscillator or phase-locked loop ("PLL") circuit. The subsystem clock signal 104 may be provided via a clock signal distribution network or clock tree (not shown), which may include clock buffers. Failure or degradation of the clock signal source or clock buffers may cause a characteristic of the subsystem clock signal 104 to deviate from an expected value or state, possibly adversely impacting the operation of the subsystem 106. For example, the frequency of the subsystem clock signal 104 may deviate from a reference frequency more than a threshold amount. Switching from providing the primary or subsystem clock signal 104 to providing the fallback or reference clock signal 114 may reduce the likelihood of a dangerous or otherwise undesirable operating condition occurring if the subsystem 106 were to continue to operate based on a faulty subsystem clock signal 104.

Figure 2:
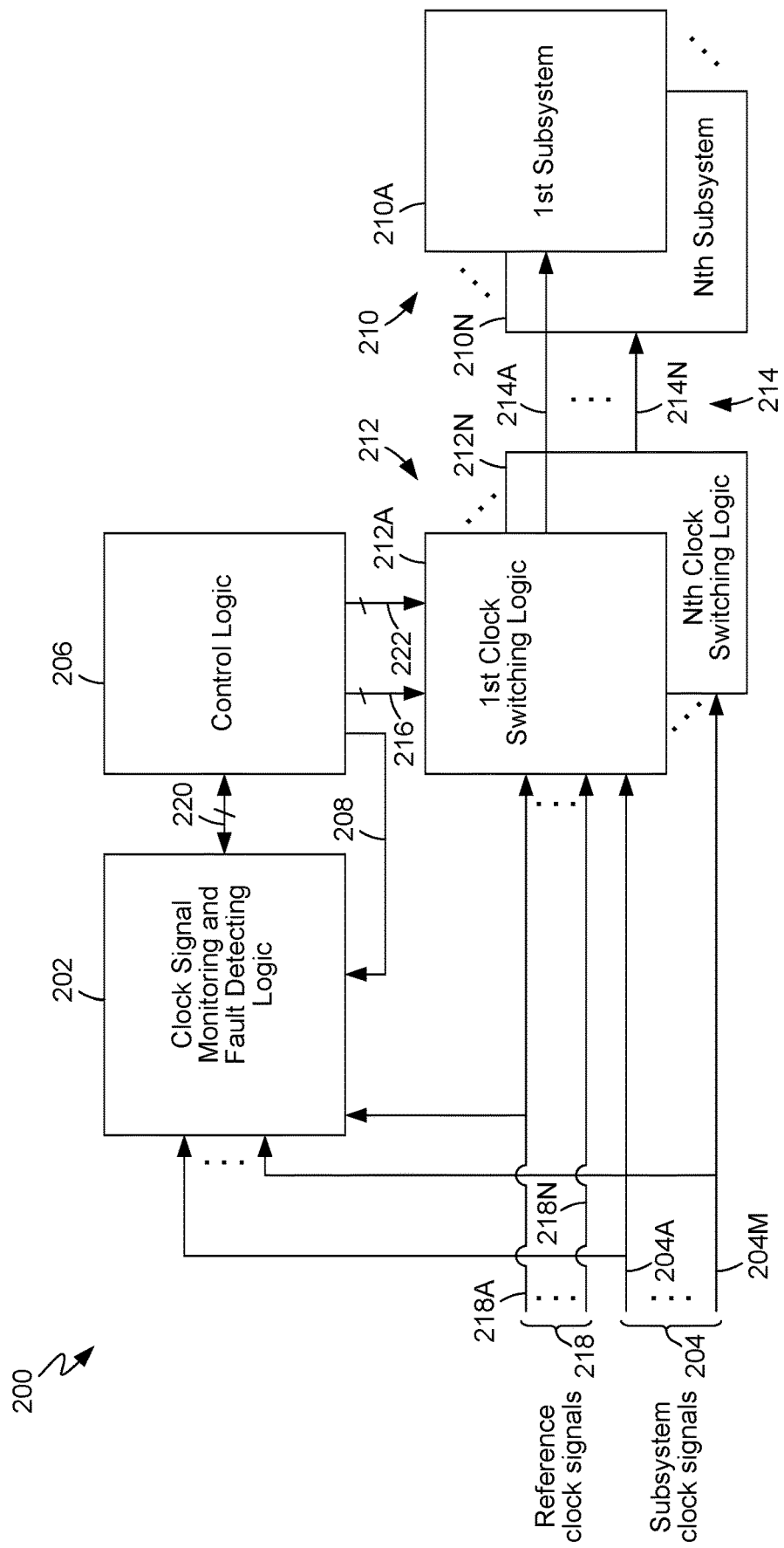
FIG. 2 is a block diagram of another system for switching clock signals in a device in response to fault detection, in accordance with exemplary embodiments.

In FIG. 2, a system 200 for switching clock signals may include a clock signal monitoring and fault detecting logic unit 202. The clock signal monitoring and fault detecting logic unit 202 may be configured to monitor two or more (N) subsystem clock signals 204, which may include a first subsystem clock signal 204A through an Nth subsystem clock signal 204N. In one example of the system 200, N may be 32. That is, 32 subsystem clock signals 204 may be monitored. Nevertheless, in other examples there many be fewer than 32 or more than 32 subsystem clock signals 204.

The clock signal monitoring and fault detecting logic unit 202 may be configured to monitor the subsystem clock signals 204 in any manner. For example, the clock signal monitoring and fault detecting logic unit 202 may be configured to monitor the subsystem clock signals 204 in accordance with a sequence or pattern. That is, the clock signal monitoring and fault detecting logic unit 202 may monitor the first subsystem clock signal 204A, then a second one (not separately shown) of the subsystem clock signals 204, etc., through the Nth subsystem clock signal 204N, and then return to monitoring the first subsystem clock signal 204A, in a continuous round-robin or circular fashion.

The system 200 may include a control logic unit 206 configured to, among other functions, provide a subsystem clock selection signal 208 to the clock signal monitoring and fault detecting logic unit 202 that indicates which of the N subsystem clock signals 204 to monitor, e.g., in accordance with the aforementioned sequence. Although not directly relevant to the embodiments of switching clock signals in response to detected clock signal faults described herein, the control logic unit 206 may also include features for responding to detected clock signal faults in other ways, such as by alerting an operator of a potentially unsafe condition, logging clock signal faults, etc. Such a control logic unit may be included in a "system health manager" unit that monitors for, and responds to, various conditions that may indicate degradation or failure of components.

The N subsystem clock signals 204 may be correspondingly provided to N subsystems 210, which may include a first subsystem 210A through an Nth subsystem 210N. The system 200 may also include N clock switching logic units 212, which may include a first clock switching logic unit 212A through Nth clock switching logic unit 212N.

Each of the N subsystem clock signals 204 may be provided to a corresponding one of the subsystems 210 via the corresponding one of the clock switching logic units 212. Thus, the first subsystem clock signal 204A may be provided to the first clock switching logic unit 212A, a second one (not separately shown) of the subsystem clock signals 204 may be provided to a second one (not separately shown) of the clock switching logic units 212, etc., through the Nth subsystem clock signal 204N, which may be provided to the Nth clock switching logic unit 212N. The clock switching logic units 212A-212N may provide corresponding output clock signals 214A-214N (collectively referred to as output clock signals 214) to corresponding subsystems 210A-210N. Stated another way, the first subsystem clock signal 204A may be provided to the first subsystem 210A via the first clock switching logic unit 212A, a second one (not separately shown) of the subsystem clock signals 204 may be provided to a second one (not separately shown) of the subsystems 210 via a second one (not separately shown) of the clock switching logic units 212, etc., through the Nth subsystem clock signal 204N, which may be provided to the Nth subsystem 210N via the Nth clock switching logic unit 212N.

The clock signal monitoring and fault detecting logic unit 202 may be configured to detect one or more faults associated with each of the N monitored clock signals 204, such as, for example, deviation of the subsystem clock signal frequency from a reference frequency. Initially, i.e., while no clock fault is detected, each clock switching logic unit 212A-212N may provide the corresponding subsystem clock signal 204A-204N as its corresponding output clock signal 214A-214N.

The clock signal monitoring and fault detecting logic unit 202 may provide one of N clock switching signals 216 to each of the N clock switching logic units 212. If the clock signal monitoring and fault detecting logic unit 202 detects a fault associated with one of the subsystem clock signals 204A-204N, the clock signal monitoring and fault detecting logic unit 202 may assert the corresponding one of the clock switching signals 216 to indicate such clock fault detection to the corresponding one of the clock switching logic units 212.

In response to assertion of one of the clock switching signals 216 (thereby indicating a clock fault detection), the corresponding one of the clock switching logic units 212 may switch its output clock signal 214 from the corresponding one of the subsystem clock signals 204 to one of a number (M) of reference clock signals 218, which may include reference clocks signals 218A-218M. In the exemplary system 200, all M reference clock signals 218 are provided to each of the clock switching logic units 212. Nevertheless, in other examples (not shown) different reference clock signals may be provided to different clock switching logic units. For example, only reference clock signals having the same frequency as the corresponding subsystem clock signal may be provided to a clock switching logic unit. Also, although in the exemplary system 200 the number of reference clock signals 218 (i.e., the number M) is at least two, in other examples (not shown) of such a system there may be only a single reference clock signal. In still other examples, such a clock switching logic unit may switch from providing one of the subsystem clock signals 204 that has been determined to be faulty to providing another of the subsystem clock signals 204 that has been determined not to be faulty.

Each of the subsystem clock signals 204 may be provided from a clock signal source (not shown), such as an oscillator or PLL circuit, via a clock tree (not shown). Similarly, each of the reference clock signals 218 may be provided from a clock signal source via a clock tree. The reference clock signals 218 may be separately monitored by, for example, monitoring logic (not shown) that is similar to, but distinct from, the above-described clock signal monitoring and fault detecting logic 202. In this manner, the clock switching logic units 212 can switch any of their output clock signals 214 from one of the subsystem clock signals 204 that has been determined by the clock signal monitoring and fault detecting logic unit 202 to be faulty to one of the reference clock signals 218 that has been determined by such separate monitoring logic not to be faulty.

Also, in the exemplary system 200 the clock signal monitoring and fault detecting logic unit 202 may use one of the reference clock signals 218 to establish a reference clock frequency against which the frequencies of the subsystem clock signals 204 may be compared to determine whether a frequency deviation fault is detected. The one of the reference clock signals 218 that is used to establish a reference clock frequency may be selected based on an estimate of frequency accuracy. For example, one of the reference clock signals 218 produced by crystal oscillator-based clock source circuitry may be estimated to be more accurate than another one of the reference clock signals 218 produced by PLL-based clock source circuitry (e.g., a PLL in combination with a less accurate crystal oscillator).

Figure 3:
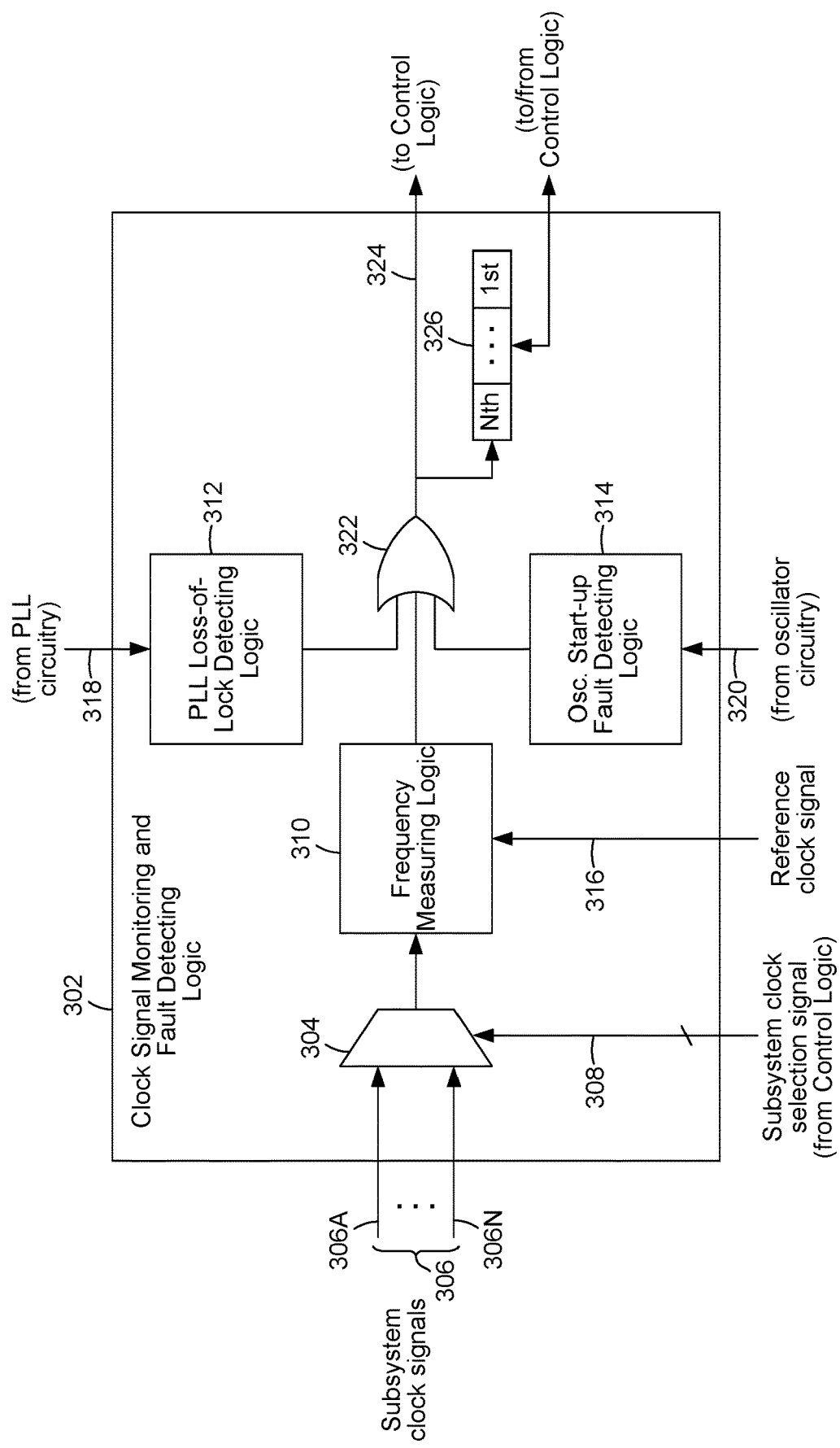
FIG. 3 is a block diagram of clock signal monitoring and fault detecting logic, in accordance with exemplary embodiments.

In FIG. 3, a clock signal monitoring and fault detecting logic unit 302 is shown that may be an example of the above-described clock signal monitoring and fault detecting logic unit 202 (FIG. 2). The clock signal monitoring and fault detecting logic unit 302 may include subsystem clock signal selecting logic 304, such as a multiplexer, configured to select one of the N subsystem clock signals 306. (The subsystem clock signals 306 in FIG. 3 may be examples of the subsystem clock signals 204 in FIG. 2.) The subsystem clock signals 306 may include a first subsystem clock signal 306A through an Nth subsystem clock signal 306N, as described above with regard to FIG. 2. Thus, based on a subsystem clock selection signal 308, the subsystem clock signal selecting logic unit 304 may select any of the N subsystem clock signals 306 from the first subsystem clock signal 306A though the Nth subsystem clock signal 306N. The subsystem clock selection signal 308 may an example of the above-described subsystem clock selection signal 208 (FIG. 2).

The clock signal monitoring and fault detecting logic unit 302 may include any of various logic configured to detect faults associated with the selected one of the subsystem clock signals 306. Such clock fault detecting logic units may include, for example, any or all of: frequency measuring logic 310; PLL loss-of-logic detecting logic 312; and oscillator start-up fault detecting logic 314. Still other examples of such clock fault detecting logic will occur readily to one of ordinary skill in the art.

The frequency measuring logic 310 may be configured to measure the amount of deviation of the frequency of the selected one of the subsystem clock signals 306 from a reference frequency. A frequency deviation of more than a threshold amount may be detected. The reference frequency may be based on a reference clock signal 316, which may be one of the above-described reference clock signals 218 (FIG. 2).

The PLL loss-of-lock detecting logic 312 may be configured to detect loss of lock of PLL circuitry (not shown) that is the source of the selected one of the subsystem clock signals 306, based on one or more signals 318 received from the PLL circuitry. As such PLL loss-of-lock detecting logic/circuitry is well understood by one of ordinary skill in the art, details thereof are not described herein.

The oscillator start-up fault detecting logic/circuitry 314 may be configured to detect start-up failure of crystal oscillator circuitry (not shown) that is the source of the selected one of the subsystem clock signals 306, based on one or more signals 320 received from the crystal oscillator circuitry. As such oscillator start-up fault detecting logic is well understood by one of ordinary skill in the art, details thereof are not described herein.

Although in the illustrated example all of the various clock fault detecting logic units are included in the clock signal monitoring and fault detecting logic unit 302 along with the subsystem clock signal selecting logic 304, in other examples some or all such clock fault detecting logic may be separate or remote from such subsystem clock signal selecting logic. For example, PLL loss-of-lock detecting logic/circuitry may be integrated with the PLL circuitry, oscillator start-up fault detecting logic may be integrated with the oscillator circuitry, etc.

Each of the various clock fault detecting logic units, such as the frequency measuring logic 310, the PLL loss-of-lock detecting logic 312, and the oscillator start-up fault detecting logic 314, may produce an indication of whether it detects a fault associated with the selected (i.e., monitored) one of the subsystem clock signals 306. The clock signal monitoring and fault detecting logic unit 302 may include fault indication aggregating logic 322 (conceptually represented in FIG. 2 by a logical-OR symbol). The fault indication aggregating logic 322 may assert a clock fault indication signal 324 when any of the various clock fault detecting logic units indicates that it detects a fault associated with the selected one of the subsystem clock signals 306. The clock fault indication signal 324 may be provided to the above-described control logic 206 (FIG. 2). The fault indication aggregating logic 322 may also store an indication in a register 326 that indicates which of the subsystem clock signals 306 has been detected to be faulty. For example, the register 326 may have N bits, and the fault indication aggregating logic 322 may store a "1" in the bit location of the register 326 corresponding to the one of the subsystem clock signals 306 detected to be faulty, where a "0" is stored in all bit locations of the register 326 corresponding to subsystem clock signals 306 detected not to be faulty (or subsystem clock signals 306 that have not yet been monitored). The control logic unit 206 (FIG. 2) may obtain the foregoing information identifying subsystem clock signals 306 detected to be faulty in any manner, such as, for example, by polling the register 326 and receiving a response (e.g., via the signal paths 220 in FIG. 2). Nevertheless, in other examples, such control logic may obtain the information in other ways, which may not involve such a register.

Figure 4:
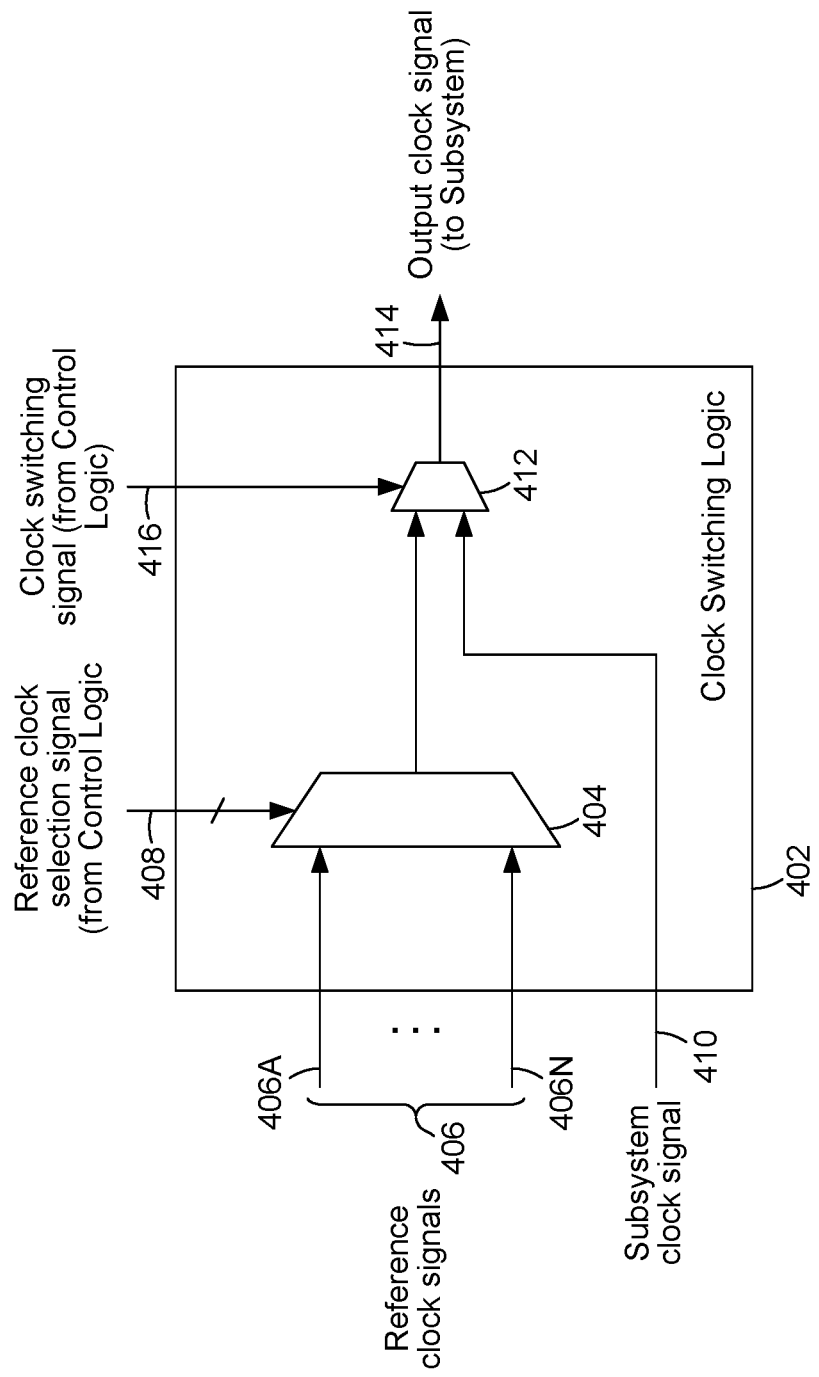
FIG. 4 is a block diagram of clock switching logic, in accordance with exemplary embodiments.

In FIG. 4, a clock switching logic unit 402 is shown that may be an example of each of the N above-described clock switching logic units 212 (FIG. 2). The clock switching logic unit 402 may include a reference clock signal selecting logic 404, such as a multiplexer. The subsystem clock signals 406 may include a first subsystem clock signal 406A through an Mth reference clock signal 406N, as described above with regard to FIG. 2. Thus, based on a reference clock selection signal 408, the reference clock signal selecting logic 404 may select any of the M reference clock signals 406 from the first reference clock signal 406A through the Mth reference clock signal 406M. (The reference clock signals 406 in FIG. 4 may be examples of the reference clock signals 218 in FIG. 2.) The reference clock selection signal 408 may be one of M reference clock selection signals 222 (FIG. 2) received from the control logic 206 (FIG. 2). The control logic 206 may use the reference clock selection signal 408 to indicate which of the M reference clock signals 406 to select as the fallback clock signal to be switched to in place of the corresponding subsystem clock signal 410 (which may be an example of one of the subsystem clock signals 204 in FIG. 2).

The clock switching logic unit 402 may also include clock switching logic 412, such as a multiplexer. In response to assertion of a clock switching signal 416, the clock switching logic 412 may switch its output clock signal 414 from the subsystem clock signal 410 to the fallback clock signal, i.e., the selected one of the reference clock signals 406. The control logic 206 (FIG. 2) may provide the clock switching signal 416 (which may an example of one of the clock switching signals 216 in FIG. 2) in the manner described above with regard to the system 200. The output clock signal 414 may be provided to one of the subsystems 210 (FIG. 2) as described above with regard to the system 200.

Figure 5:
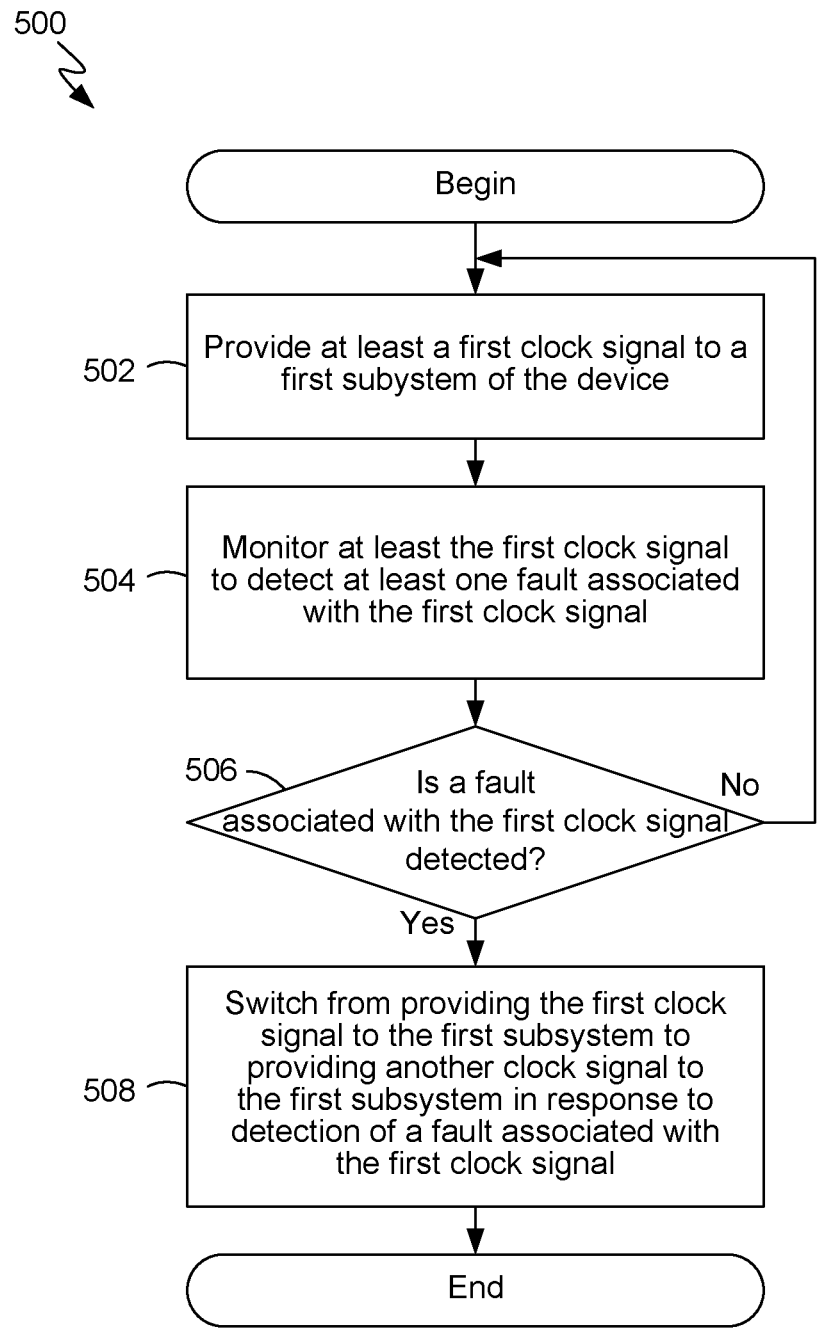
FIG. 5 is a flow diagram illustrating a method for switching clock signals in a device, in accordance with exemplary embodiments.

In FIG. 5 a method 500 for switching clock signals in a device is illustrated in flow diagram form. As described below, the device may be, for example, a system-on-a-chip ("SoC"). As indicated by block 502, the method 500 may include providing at least a first clock signal to a first subsystem of the device. As indicated by block 504, the method 500 may also include monitoring at least the first clock signal. The monitoring may include detecting at least one fault associated with the first clock signal, such as, for example, frequency deviation, PLL loss-of-lock, oscillator start-up fault, etc. If any such clock fault is detected, as indicated by block 506, then the method 500 may further include switching from providing the first clock signal to the first subsystem to providing another clock signal to the first subsystem, as indicated by block 508. So long as no such fault is detected (block 506), then the first clock signal may continue to be provided as described above with regard to block 502, and the first clock signal may continue to be monitored as described above with regard to block 504.

Figure 6:
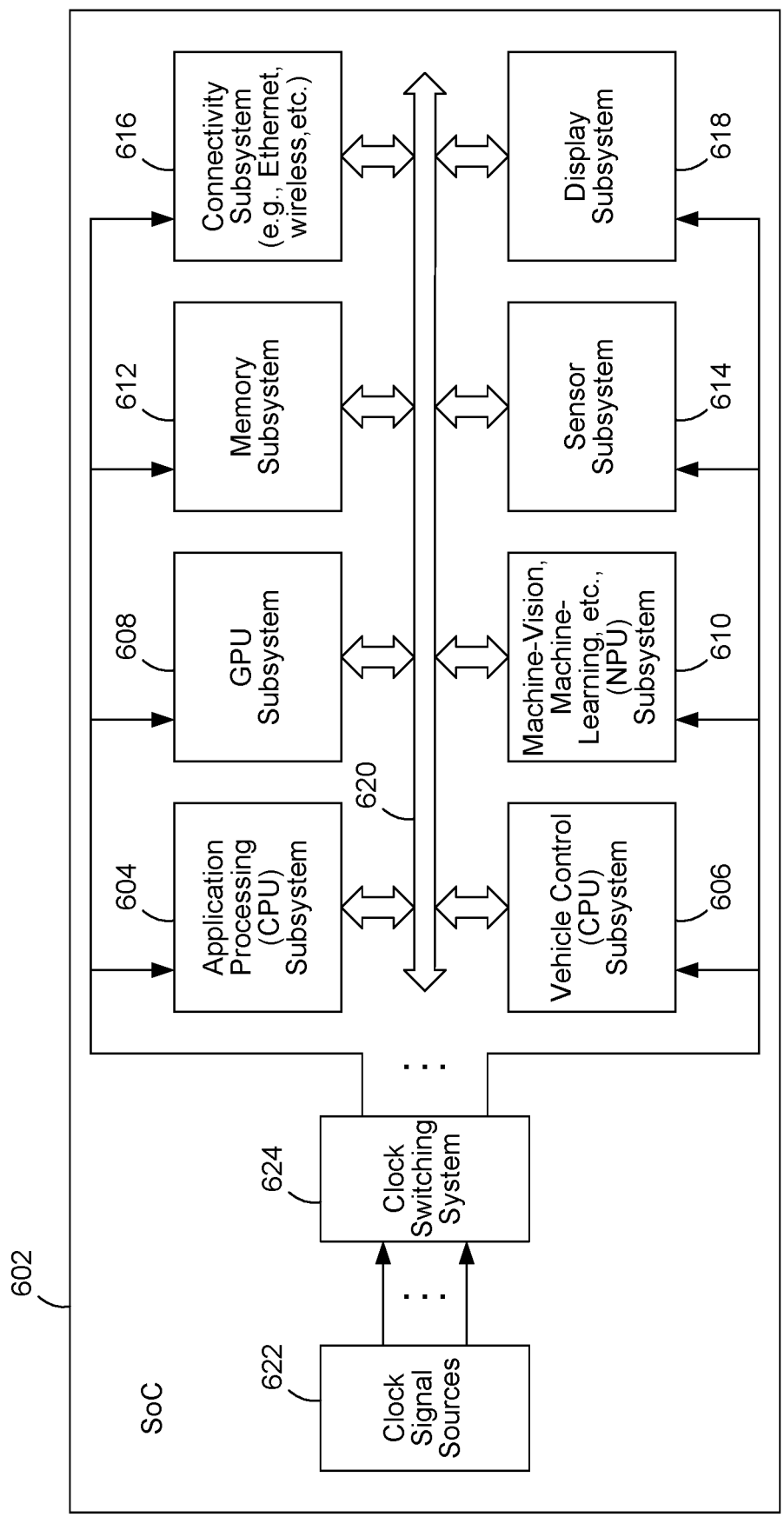
FIG. 6 is block diagram of a system-on-a-chip ("SoC") having a system for switching clock signals, in accordance with exemplary embodiments.

FIG. 6 illustrates an example of an SoC 602 in which exemplary embodiments of systems, methods, and other examples of switching clock signals may be provided. The SoC 602 may be included in, for example, a vehicle such as an automobile (not shown). Nevertheless, a vehicle-based system is intended only as an example, and systems, methods, and other exemplary embodiments of switching clock signals may be provided in other types of SoCs or other types of devices, such as Internet-of-Things ("IoT") devices, including safety-critical IoT devices. Still other exemplary embodiments may be provided in portable computing devices, such as laptop or palmtop computers, cellular telephones or smartphones, personal digital assistants, navigation devices, smartbooks, portable game consoles, satellite telephones, etc.

The SoC 602 may include various processors or processing subsystems, such as, for example: an application processing subsystem 604 having a central processing unit ("CPU"); a vehicle control subsystem also having a CPU; a graphics processing unit ("GPU") subsystem 608; a machine-vision or machine-learning subsystem 610 having a neural processing unit ("NPU"); and a memory subsystem 612; a vehicle sensor subsystem 614; a connectivity subsystem 616 (e.g., on-vehicle Ethernet, wireless transceiver, etc.); and a display subsystem 618, each of which may have a type of processor or processing logic that relies on a subsystem clock signal for proper operation. The subsystems 604-618 may be interconnected by one or more buses or other data interconnects 620. It should be understood that the subsystems 604-618 are intended only as examples of subsystems that may include processors or similar logic that operates based on one or more clock signals, and others may occur readily to one of ordinary skill in the art. The term "subsystem" is used broadly herein, and may be construed as including any type of processor or processing logic configured to perform a function based on a clock signal.

The SoC 602 may also include one or more clock signal sources 622 and a system 624 for switching clock signals based on fault detection. The system 624 may comprise the above-described system 100 (FIG. 1) or 200 (FIG. 2). One or more clock signals may be provided from the clock signal sources 622 to the various subsystems 604-618 via the system 624 for switching clock signals and via corresponding clock trees (clock buffers or other components of which are not shown for purposes of clarity). The system 624 may sense or receive the clock signals from the clock trees. Although the system 624 is depicted in FIG. 6 as a single block for purposes of clarity, it should be understood that portions of the system 624 may be distributed or located remotely from each other on the SoC 602. For example, clock switching logic units 212 (FIG. 2) may be located in proximity to their corresponding subsystems 210 (FIG. 2) or included in such subsystems.

Implementation examples are described in the following numbered clauses.

1. A method for switching clock signals in a device, comprising:
   providing at least a first clock signal to a first subsystem of the device;

monitoring at least the first clock signal, including detecting at least one fault associated with the first clock signal; and switching from providing the first clock signal to the first subsystem to providing another clock signal to the first subsystem in response to detection of a fault associated with the first clock signal.

2. The method of clause 1, wherein:

providing at least the first clock signal to the first subsystem of the device comprises providing a plurality of clock signals to a corresponding plurality of subsystems; and monitoring at least the first clock signal comprises monitoring each of the plurality of clock signals.

3. The method of clause 2, wherein each subsystem includes a processor operable based on a corresponding one of the clock signals.

4. The method of clause 2 or 3, wherein the another clock signal comprises a reference clock signal not included in the plurality of clock signals.

5. The method of clause 4, further comprising selecting the reference clock signal from among a plurality of reference clock signals.

6. The method of any of clauses 2-5, wherein monitoring each of the plurality of clock signals comprises sequentially selecting each of the plurality of clock signals.

7. The method of any of clauses 1-6, wherein monitoring at least the first clock signal comprises:

measuring a frequency of the first clock signal;

comparing a measured frequency of the first clock signal with a reference frequency; and providing a fault detection signal when a comparison between a measured frequency of the first clock signal and the reference frequency indicates at least one of: frequency drift; frequency mismatch; and zero frequency.

8. The method of any of clauses 1-7, wherein detecting at least one fault comprises detecting loss of lock of a phase-locked loop.

9. The method of any clauses 1-8, wherein detecting at least one fault comprises detecting an oscillator startup fault.

10. A system for switching clock signals in a device, comprising:

fault detecting circuitry/logic configured to monitor at least a first clock signal provided to a first subsystem of the device and to detect at least one fault associated with the first clock signal; and clock switching circuitry/logic configured to switch from providing the first clock signal to the first subsystem to providing another clock signal to the first subsystem in response to detection of a fault associated with the first clock signal.

11. The system of clause 10, wherein:

the fault detecting circuitry/logic is configured to monitor each of a plurality of clock signals provided to each of a corresponding plurality of subsystems and to detect at least one fault associated with a monitored clock signal; and the clock switching circuitry/logic is configured to switch from providing the monitored clock signal to a corresponding subsystem to providing the another clock signal to the corresponding subsystem in response to detection of a fault associated with the monitored clock signal.

12. The system of clause 11, wherein each subsystem includes a processor operable based on a corresponding one of the clock signals.

13. The system of clause 11 or 12, wherein the another clock signal comprises a reference clock signal not included in the plurality of clock signals.

14. The system of clause 13, wherein the clock switching circuitry/logic comprises reference clock signal selecting circuitry configured to select the reference clock signal from among a plurality of reference clock signals.

15. The system of any of clauses 11-14, wherein the fault detecting circuitry/logic comprises monitored clock signal selecting circuitry configured to sequentially select each of the plurality of clock signals.

16. The system of any of clauses 10-15, wherein the system comprises a system-on-a-chip ("SoC").

17. A system for switching clock signals in a device, comprising:

means for providing at least a first clock signal to a first subsystem of the device;

means for monitoring at least the first clock signal, including detecting at least one fault associated with the first clock signal; and means for switching from providing the first clock signal to the first subsystem to providing another clock signal to the first subsystem in response to detection of a fault associated with the first clock signal.

18. The system of clause 17, wherein:

the means for providing at least the first clock signal to the first subsystem of the device comprises means for providing a plurality of clock signals to a corresponding plurality of subsystems; and the means for monitoring at least the first clock signal comprises means for monitoring each of the plurality of clock signals.

19. The system of clause 18, wherein each subsystem includes a processor operable based on a corresponding one of the clock signals.

20. The system of clause 18 or 19, wherein the another clock signal comprises a reference clock signal not included in the plurality of clock signals.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for switching clock signals in a device, comprising:

providing a plurality of clock signals to a corresponding plurality of subsystems of the device;

monitoring each of the plurality of clock signals sequentially one at a time, including detecting a clock signal having at least one fault from the plurality of clock signals;

storing in a register a status of each clock signal of the plurality of clock signals being monitored including a status indicating if a particular clock signal has a fault;

transmitting the status of each of the plurality of clock signals to control logic; and the control logic switching the clock signal having the fault to a reference clock signal in response to detection of the at least one fault, the reference clock signal is not included in the plurality of clock signals being monitored.

2. The method of claim 1, wherein each subsystem includes a processor operable based on a corresponding one of the clock signals.

3. The method of claim 1, further comprising selecting the reference clock signal from among a plurality of reference clock signals.

4. The method of claim 1, wherein monitoring each of the plurality of clock signals comprises selecting each of the plurality of clock signals for monitoring in a round-robin fashion.

5. The method of claim 1, wherein monitoring each of the plurality of clock signals comprises:
measuring a frequency of each clock signal;
comparing a measured frequency of each clock signal with a reference frequency; and
providing a fault detection signal when a comparison between a measured frequency of each clock signal and the reference frequency indicates at least one of: frequency drift; frequency mismatch; and zero frequency.

6. The method of claim 1, wherein at least one fault comprises loss of lock of a phase-locked loop.

7. The method of claim 1, wherein at least one fault comprises an oscillator startup fault.

8. A system for switching clock signals in a device, comprising:
fault detecting circuitry configured to monitor each of a plurality of clock signals sequentially one at a time provided to a corresponding plurality of subsystems of the device and to detect a clock signal having at least one fault from the plurality of clock signals;
the fault detecting circuitry storing in a register a status of each clock signal of the plurality of clock signals being monitored including a status indicating if a particular clock signal has a fault;
control logic coupled to the fault detecting circuitry and to clock switching circuitry; the control logic polling the register for the status of each clock signal; the control logic issuing commands to the clock switching circuitry in response to a status from the register indicating a particular clock signal has a fault; and
clock switching circuitry configured to switch from the clock signal having the fault to a reference clock signal in response to a command from the control logic upon receipt of status indicating detection of a fault, the reference clock signal is not included in the plurality of clock signals being monitored.

9. The system of claim 8, wherein each subsystem includes a processor operable based on a corresponding one of the clock signals.

10. The system of claim 8, wherein the clock switching circuitry comprises reference clock signal selecting circuitry configured to select the reference clock signal from among a plurality of reference clock signals.

11. The system of claim 8, wherein the fault detecting circuitry comprises monitored clock signal selecting circuitry configured to select each of the plurality of clock signals in a round-robin fashion.

12. The system of claim 8, wherein the system comprises a system-on-a-chip ("SoC").

* * * * *